United States Patent Office 3,092,321
Patented June 4, 1963

3,092,321
AUTOMATIC CONTROL SYSTEM OF THE CURRENT-SUMMING TYPE
Edward J. Cranch, Bryn Athyn, Elwood T. Davis, Havertown, and Ernst W. Voorhoeve, Ambler, Pa., assignors to Leeds and Northrup Company, Philadelphia, Pa., a corporation of Pennsylvania
Filed Sept. 14, 1959, Ser. No. 839,788
13 Claims. (Cl. 236—15)

This invention relates to control systems for regulating the operation of a final control element to maintain the magnitude of a condition at a selected value and has for an object the provision of current-responsive input circuits of a character which are reliable and which provide a high degree of flexibility of control operations.

Control systems have heretofore been provided with input systems primarily of the voltage-responsive type and also of the current-responsive type. However, with current-responsive systems, the current output from a condition-responsive system has in general been utilized for the development of a potential difference, the magnitude of which is then utilized in comparison with the magnitude of a second potential difference for varying the magnitude of the condition to be controlled.

It is an object of the present invention to provide a system of the current-summation type, that is to say, a system which produces an output potential-difference of magnitude dependent upon the algebraic sum of two currents, one of magnitude related to a desired magnitude of the condition, and the other of a magnitude corresponding with the existing magnitude of the condition.

It is a further object of the present invention to provide in conjunction with a current output of a condition-responsive system an arrangement which in conjunction with a second source of current and a current-summing circuit element varies said current output to achieve a control action primarily due to the resultant potential difference developed by the resultant of the two currents through the summing circuit element.

It is yet another object to provide a control system including a rate effect in which the rate effect is related solely to changes in the magnitude of the condition and independent of change in the set-point.

In carrying out the present invention in one form thereof, there is provided a system for producing a current of magnitude related to the magnitude of a condition to be controlled. This current flows through a circuit including a resistor for the development across that resistor of a potential difference. There is provided in association with said resistor a further means for producing a second current of magnitude related to a desired magnitude of said condition. When the magnitude of the condition is equal to the desired magnitude, the potential difference developed across the resistor will be zero. However, that potential difference will vary in polarity and magnitude as the condition deviates from its desired magnitude in dependence upon the direction and extent of the deviation. The system includes means responsive to the potential difference across the resistor for varying the magnitude of said condition in a direction to reduce said potential difference to zero.

For further objects and advantages of the invention and for a detailed discussion of the operation of several embodiments of the invention, reference is to be had to the following description taken in conjunction with the accompanying drawings, in which.

Figure 1:
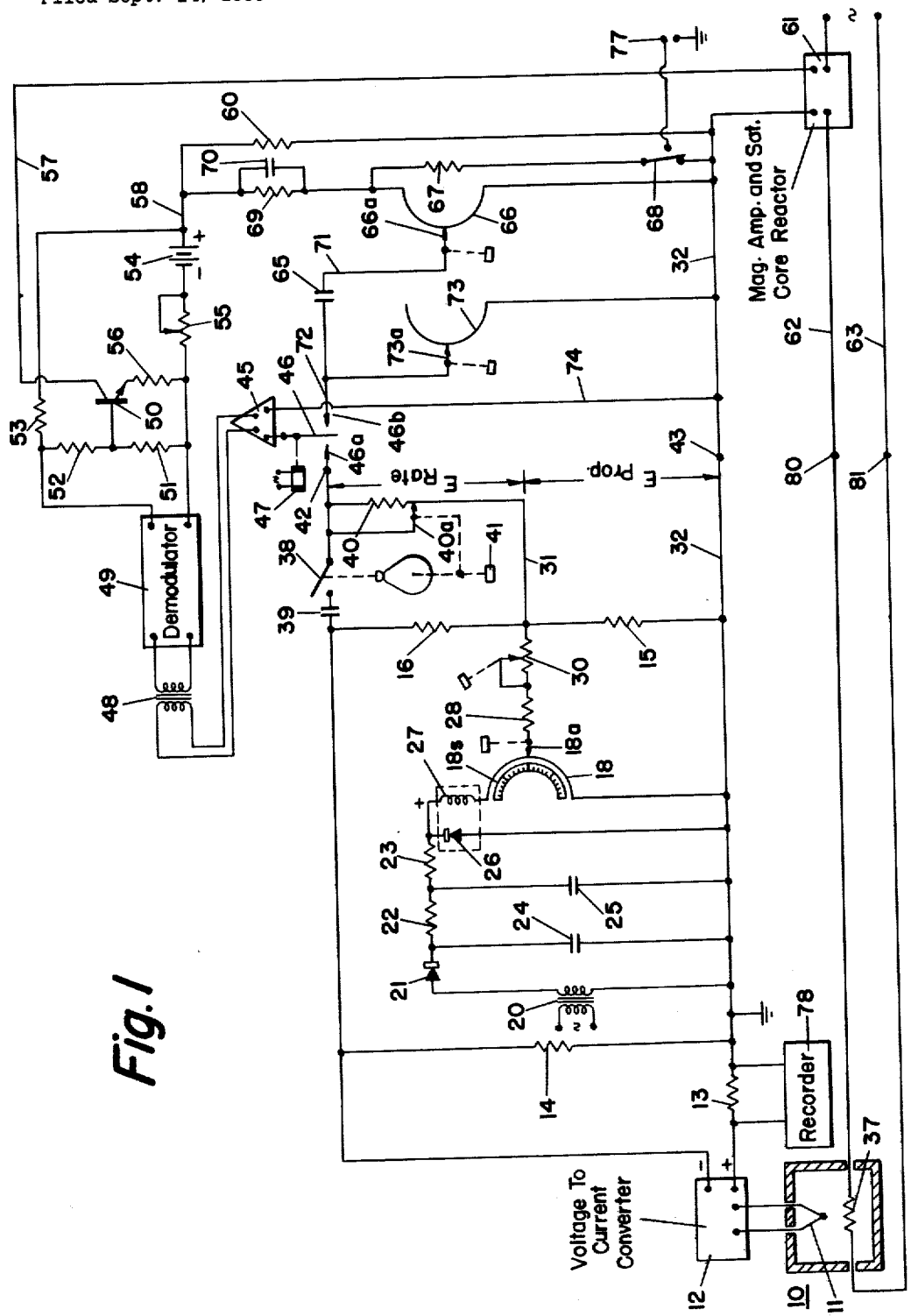
FIG. 1 is a wiring diagram in which the invention is schematically illustrated.

Referring to the drawings, the invention in one form has been shown as applied to the control of the magnitude of a condition, such as the temperature of a furnace 10, it being understood that the invention is applicable for the control of conditions of all kinds and whether of a chemical or physical nature. As applied to the furnace 10, there is provided a condition-responsive detecting element shown as a thermocouple 11 connected to a voltage-to-current converter 12 which may be of the type disclosed in McAdam et al. Patent 2,901,563. The converter 12 functions to transform the voltage output of the thermocouple 11 into a current output. The current from the converter 12 flows through a series resistor 13. A part of the current flows through a current-dividing resistor 14. The remainder of the current flows through a summing resistor 15 and a current-dividing resistor 16. As will be later explained, the relative magnitudes of the resistors 14 and 16 determine the ratio of the current division between the branch circuits respectively including resistors 14 and 16. The manner in which the system of Patent 2,901,563 may be used as the converter 12 will be apparent by reference to FIG. 1 thereof where the resistors 31 and 32 of the patent correspond with the aforesaid resistors 13 and 14.

As the magnitude of the condition under control varies, so does the current flow through the branch circuit including resistors 15 and 16. Accordingly, there will be developed across the resistor 15 a potential difference proportional to the magnitude of the current flow through resistor 15. In order to establish an output voltage or potential difference proportional to the deviation in the magnitude of the condition, the temperature of furnace 10, from a desired value, there is provided an arrangement for producing a current of magnitude related to the desired or selected magnitude of the condition under control. This means may comprise a variable resistor 18 of the slidewire type. The magnitude of this current which flows through resistor 15 is determined by the relative setting between the adjustable contact or tap 18a and the resistor 18.

The last-mentioned current may be supplied from any suitable constant-voltage source, and as shown that source includes a transformer 20 energized from an alternating-current source of supply. The secondary winding is connected in circuit with a rectifier 21 and a filter circuit including filter resistors 22 and 23 and filter capacitors 24 and 25. For voltage regulation and temperature compensation, that is to say, to establish a constant voltage across the resistor 18 which does not change with change in line voltage or ambient temperature, there is connected in shunt with that resistor a temperature-compensating voltage-regulating circuit. This circuit includes a Zener diode 26, such as a 1N470, and a resistor 27 of nickel and shown in the form of a coil. It is shown in the form of a coil, and within the unit illustrated by the broken-line rectangle, to indicate that the resistor 27 is in close thermal contact with the Zener diode 26.

In series with the adjustable tap 18a is a resistor 28 of relatively high value. Resistor 28 in one application had a value of 20,000 ohms where resistor 15 was of 2,400 ohms, and the slidewire 18 was 1,000 ohms. The resistor 18 is provided to produce a swamping action, that is to say, to make the current flow through resistor 28 directly proportional to the change in position of tap 18a on resistor 18. The resistor 28 may be adjustable, but it is preferred to provide a second resistor or rheostat 30 which is adjustable to regulate the maximum current flow through the resistor 15 with the contact or tap 18a at its uppermost, maximum-voltage, position. Thus, the rheostat 30 is used to calibrate the system and particularly so that a scale 18s associated with the resistor 18 will in conjunction with the position of the contact or tap 18a along that scale indicate a desired magnitude of the condition.

It will be seen that current from the converter 12 will tend to flow upwardly through resistor 15 and current as derived from the slidewire 18 will tend to flow downwardly through resistor 15. Assuming that the contact 18a has been set to the desired magnitude of the condition as read from the scale 18s, the potential difference labeled $E_{Prop.}$ will be proportional to the difference between the two currents, and the polarity will be determined by the current having the larger magnitude. If the magnitude of the condition, the temperature of furnace 10, as detected by the thermocouple 11 is less than the temperature at which the contact 18a is set on scale 18s, the magnitude of current from the slidewire 18 will exceed that from the converter 12, and the conductor 31 will be made positive relative to conductor 32. When the magnitude of the condition increases above the set point, the polarity of the voltage derived from the summing or comparing resistor 15 will then reverse. For normal operation, with the temperature of furnace 10 at the set point, there will be no potential difference developed across resistor 15, and conductor 31 will be at the same potential as conductor 32.

The voltage-to-current converter 12 functions to produce a current output proportional to the magnitude of the voltage-input; more particularly, to maintain the aforesaid proportionality, notwithstanding any change which may occur in the resistance of the output circuit. Accordingly, if the converter 12 be located near the apparatus or process under control, the remainder of the control equipment may be disposed at a remote location as at a control panel and without effect upon the operation due to the resistance of the leads, and without effect by reason of change in the resistance of the leads due to temperature and the like. In said Patent 2,901,563, there is set forth the manner in which the foregoing current output is achieved. In brief, the current output is always maintained proportional to the voltage input by reason of the inclusion in the negative feedback circuit of a current-responsive feedback means to produce a voltage to be compared with the input voltage which acts to maintain the aforesaid proportionality between the output current and the voltage input, notwithstanding change in lead resistance and the like.

By reason of the arrangements thus far described, the conductor 32 may be connected to ground. This establishes ground potential for the mid-point between resistors 13 and 14, ground potential for one side of the power supply including the transformer 20 and the resistor 18, and ground potential for one side of the potential output obtained between conductors 31 and 32. This feature adds to the stability of operation of the system.

The manner in which the output voltage, $E_{Prop.}$ is utilized to control the operation of the final control element 37, shown as a heating resistor, will now be set forth. To simplify the description, a switch 38 is shown in the open position. Thus, a rate capacitor 39 is disconnected from a circuit. There is also removed from the circuit a rate resistor 40, its associated contact 40a being shown in its lowermost position. This contact 40a is adjustable by a rate-regulating knob 41. Accordingly, the deviation voltage $E_{Prop.}$ appears at output terminals 42 and 43. These output terminals will later be referred to in connection with the modifications of FIGS. 2 and 3.

In FIG. 1, the deviation voltage is applied to a voltage-comparing modulator circuit including the vibrator 46 of the single-pole, double-throw polarized type driven at a suitable frequency, as for example, 60 cycles per second, as by an operating coil 47 connected to a 60-cycle per second source of supply. The deviation voltage is applied to contact 46a of vibrator 46 while a negative feedback voltage, later to be described, is applied to contact 46b. Operation of the movable pole of vibrator 46 sequentially to contact stationary contacts 46a and 46b produces an ouput voltage from the vibrator 46 having a 60-cycle component of magnitude which is proportional to the difference between the deviation voltage and the feedback voltage and of phase depending upon which of the voltages is the larger. When the two voltages are of the same magnitude, no 60-cycle component is present in the output from the modulator circuit including the vibrator 46. The output from the modulator circuit is applied to an amplifier 45 which develops an amplified alternating current voltage in the secondary of a coupling transformer 48 whenever a 60-cycle component is present in the voltage applied to the input of the amplifier 45. The amplified alternating current is demodulated or converted to direct current as by a demodulator 49 of the phase-sensitive type. It may comprise a demodulator such as the one associated with the amplifier 20 of said Patent 2,901,563. Thus, the demodulator 49 produces a direct current output of magnitude and polarity depending upon whether the alternating current input signal to the demodulator is of one phase or of an opposie phase.

The output of the demodulator is applied to an amplifying stage of the current output type shown as including a transistor 50. The input circuit to the transistor 50 includes a signal-developing resistor 51 which is connected directly to one side of the demodulator and through a resistor 52 to the other side of the demodulator output circuit. The resistor 52 in conjunction with a resistor 53 forms part of a biasing circuit for the transistor 50. This biasing circuit extends from a constant voltage source 54, shown in the form of a battery, and having in series therewith a rheostat 55 for predetermining the magnitude of the maximum current which may flow through the transistor 50. By providing the constant voltage source 54, the rheostat 55 is effective to establish a current of predetermined maximum value. Thus, this maximum current value can be set to correspond with the value required to produce maximum flow of heating current to heating coil 37. This feature is desirable in order to limit the magnitude of the voltage which may be developed by the accumulation of charge on a reset capacitor 65. The amplifying stage also includes a degenerative or negative feedback resistor 56 which provides additional stability of operation of the amplifying stage.

The ouput from the amplifying stage appears between output conductors 57 and 58. Current flows from the amplifying stage from the source of supply 54 by way of conductor 58 through a feedback resistor 60, the input circuit of a magnetic amplifier 61 including a saturable core reactor, the conductor 57, transistor 50, and by way of the feedback resistor 56 and the rheostat 55 to the other side of the source of supply.

The magnetic amplifier 61 is responsive to the magnitude of the current flowing in the aforesaid output circuit of the amplifying stage and is associated with a saturable core reactor for controlling energizing current for the heating resistor 37 by way of conductor 62 connected through the saturable core reactor and conductor 63 to the indicated alternating-current source of supply. The magnetic amplifier and saturable core reactor 61 may be of any suitable type, satisfactory operation having been obtained with the type available from Fidelity Instrument Corporation, such as its Model No. 1147.

The feedback resistor 60 develops from the output current flowing in conductor 58 a negative feedback voltage for application to the contact 46b of vibrator 46. The provision of a negative feedback voltage introduces a proportional action effect in the control of the output current in conductor 58 so that this current is maintained proportional in magnitude to the deviation voltage applied to contact 46a of vibrator 46. In order to vary this proportionality, an adjustable resistor 66 is included in the feedback circuit between the feedback resistor 60 and the contact 46b. Additionally, in order to provide reset action in the control of the final control element 37, there is associated with the feedback resistor 60 a reset capacitor 65 connected in series with the stationary contact 46b of the vibrator 46 and the lower fractional part of a resistor 66 of the slidewire type extending between the grounded conductor 32 and the adjustable contact or tap 66a. A resistor 67 is shown connected by a switch 68 in shunt with the whole of resistor 66. The parallel connected resistors 66 and 67 have in series therewith a resistor 69 shunted by a capacitor 70.

The resistor 69 and capacitor 70 form a lead network to introduce a phase correction to provide additional stability of the feedback loop. For systems where the final control element 61 has a non-linear characteristic, compensation for the non-linearity is provided by making one or both of resistors 67 and 69 non-linear in a compensating direction, as by use of diodes for non-linear resistors 67 and 69 having such non-linear characteristics.

Since the output of the amplifier including the transistor 50 is a current, the resistor 60 (having a resistance of 2500 ohms which is much lower than the resistors 66 and 67 respectively 30,000 ohms and 56,000 ohms) is primarily the voltage-developing resistor for the feedback network. The feedback voltage as appearing between conductors 32 and 71 is applied to a charging circuit of the reset capacitor 65, that charging circuit including a conductor 72 and an adjustable reset resistor 73. There is developed across the reset resistor 73 a potential difference which appears between one input conductor 74 of the amplifier 45 and the stationary contact 46b.

This negative feedback voltage is, by action of the movable pole of the vibrator 46, compared with the input voltage developed between contact 46a and the input conductor 74. If the applied potential at 46a is greater than that at 46b, the alternating current applied to the demodulator 49 will be of one phase. If the potential at contact 46b exceeds that at contact 46a, the alternating current applied to demodulator 49 will be of opposite phase. The magnitude of the negative feedback voltage developed by reset resistor 73 is dependent upon the magnitude of the current flowing through reset resistor 73 and reset capacitor 65 and, by the action of amplifier 45 and other components of the feedback loop, is maintained substantially equal to the voltage applied to contact 46a.

In order to maintain uniform the magnitude of the current flowing through reset resistor 73 (for a constant potential difference), the voltage between conductors 32 and 71 must be changed at the same rate as the change of voltage on the capacitor 65, that is to say, the voltage between conductors 32 and 71 must change at a rate to produce a uniform or constant flow of current to the capacitor 65 whenever a constant voltage or potential difference exists at contact 46a relative to conductor 74. This is achieved through the action of the amplifier 45 and the transistor-amplifying stage 50. More particularly, as current flows to capacitor 65, it acquires a charge. In the absence of a change in the voltage between conductors 32 and 71, the charging current for the capacitor 65 will decrease. A decrease, however, is reflected by a fall in potential at stationary contact 46b. This fall in potential is immediately detected to produce an increased output at the amplifier 45 which, in turn, produces an increased current output from transistor 50. The increased current flow through resistor 60 increases the voltage between conductors 32 and 71 and thus tends to maintain constant the feedback voltage developed by reset resistor 73. The result of the increased current flow from the transistor 50 by way of the magnetic amplifier and the saturable core reactor 61 is to increase the energization of the heating resistor 37. Thus, the reset capacitor 65 and the associated network increases the restoring action of the heating resistor 37 to return the temperature of the furnace 10 to normal upon deviation from a predetermined magnitude. Stated differently, the capacitor 65 accumulates a charge which is representative of the time integral of deviation of the temperature of the compartment 10 from the set point.

If the temperature of compartment 10 should undergo a sudden fixed deviation from the set point to produce a deviation voltage between contact 46a and conductor 74, then the output current in conductor 58 would immediately change by a proportional amount sufficient to produce a current through capacitor 65 and resistor 73 to provide a voltage at contact 46b relative to conductor 74 of magnitude equal to the deviation voltage. As the capacitor 65 acquires a charge due to this current flow, the current and voltage across resistor 73 tends to decrease and the aforementioned corrective action occurs to produce a change in the current flow through conductor 58, which change is at a rate proportional to the magnitude of the deviation of the temperature of the compartment 10 from the set point. There is thus introduced into the control of the current in conductor 58 and the flow of heating current in conductors 62 and 63 a proportional and reset action.

If, in addition to proportional and reset actions, it is desired to have the system include rate action, the knob 41 is rotated in a direction to include a fraction of the resistor 40 in circuit with the rate capacitor 39. The movement of rotation of knob 41 from the illustrated position rotates a cam, or by other suitable means closes the switch 38 to complete the foregoing circuit.

It will now be assumed that the temperature of the furnace 10 is decreasing at a uniform rate. By reason of the action of the converter 12, the current flowing through the branch 14 and the branch 15, 16 will also be decreasing at a corresponding rate. The potential difference across resistor 16 will be decreasing at a corresponding rate. Accordingly, there will be a current flowing through a circuit which includes the rate capacitor 39 and the rate resistor 40, the magnitude of the current being proportional to the foregoing rate of change of the temperature of furnace 10.

With current flowing through the rate resistor 40, it will develop a potential difference between terminal 42 and conductor 31 which will be algebraically added to the potential difference appearing across resistor 15. In the assumed case, the potential difference $E_{Rate}$ developed across the rate resistor 40 will, when the temperature is below the set point, be added to the potential difference $E_{Prop.}$ thus to provide an increase in energization of the heating resistor 37 proportional to the rate of change of the temperature of furnace 10.

It is to be observed that when the temperature of the furnace 10 is at the set point, the currents tending to flow through the resistor 15 balance out. Thus, while there is no current flow through resistor 15, current does flow through the resistor 16, and it has a magnitude proportional to the temperature of the furnace 10.

It is further to be observed that a change in the position of contact 18a on slidewire 18 does not introduce a change in current through resistor 16 and, accordingly, does not introduce a rate action by reason of change of the set point for the temperature. This will be seen by reason of the fact that a change in the position of contact 18a will be effective in changing the current through resistor 15, but not through resistor 16.

The system of the present invention provides a high degree of flexibility in the control of the magnitudes of conditions. Thus, the set point may be selected as desired by the position of contact 18a on slidewire 18. Similarly, the magnitude of the rate action is determined by the position of contact 40a on resistor 40. The reset action can be increased or decreased by change in the position of contact 73a of rheostat 73. In order to adjust the proportional band, a knob is provided for the relative adjustment between the contact 66a and its associated slidewire 66. The change in the proportional band is accomplished by changing the magnitude of the feedback voltage applied to the reset capacitor 65 for a given output current. To decrease the proportional band, the contact 66a will be moved in a downward direction to decrease the magnitude of the feedback voltage, i.e., the voltage appearing between conductors 32 and 71.

If desired, there may be introduced auxiliary control functions. Thus, by operating the single-pole, double-throw switch 68 to its uppermost position, there will be established a connection to an input terminal 77 from which there will be supplied an input current having a magnitude proportional to the auxiliary response desired in the control system. The auxiliary response is achieved by reason of the resultant modified action on the feedback voltage appearing between conductors 32 and 71. It can be additive or subtractive in its operation, depending upon the direction of current flow.

Though the present system does not require the presence of either an indicator or a recorder, it is frequently desirable to provide such an instrument. As shown, an indicator-recorder 78 is shown connected to be responsive to the current flowing through the resistor 13. Thus, the indicator-recorder 78 responds to the potential difference across resistor 13 and provides for the indication and/or recordation of the temperature of the furnace 10.

Figure 2:
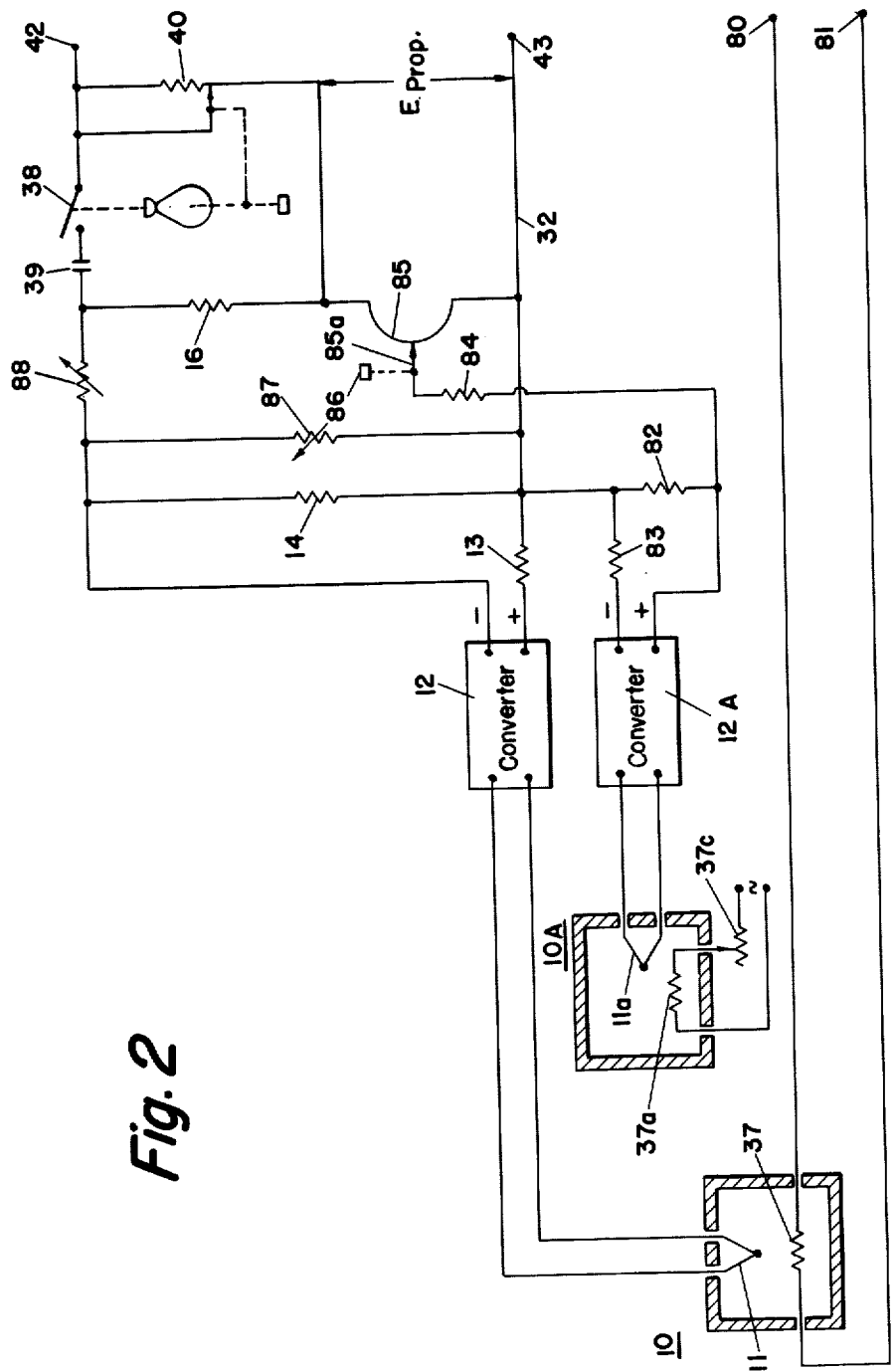
FIG. 2 is a wiring diagram of a modified part of FIG. 1.

Further to illustrate the degree of flexibility of control which may be achieved in accordance with the present invention, reference is now to be had to FIG. 2 which illustrates that part of the system of FIG. 1 disposed to the left of terminals 42, 43, 80 and 81. It is to be understood that that part of FIG. 1 disposed to the right of these terminals will be identical for FIG. 2 as for FIG. 1. Corresponding parts in FIG. 2 have been given the same reference characters as in FIG. 1. In the system of FIG. 2, it is desired that the magnitude of one condition, the temperature of furnace 10, be maintained at a magnitude which always bears a predetermined relation to the magnitude of a second and related condition, such for example as the temperature of furnace 10A having a heating resistor 37a and a controlling-rheostat 37c. Such an arrangement has utility in certain processes where the temperature of furnace 10 may be representative of a controlled variable, while the temperature of furnace 10A might be termed a "wild" variable. Such systems may find their counterpart in processes where temperatures, pressures, flow and other variable conditions are interrelated through the process, but not as directly as may be indicated by the two furnaces illustrated for purposes of simplifying the system of FIG. 2.

A thermocouple 11a of furnace 10A has its output applied to a voltage-to-current converter 12A of the same type as the converter 12 of FIG. 1. The converter 12A produces a flow of current through resistors 82 and 83 of magnitude proportional to the temperature of furnace 10A. The resistors 82 and 84 are current-dividing resistors. Current flowing through the resistor 84 flows to resistor 85 by way of the tap or contact 85a, which is adjustable as by a knob 86. The resistor 85 in function corresponds with the resistor 15 of FIG. 1 in that the proportional voltage $E_{Prop.}$ is developed across resistor 85. It will be observed that the polarity of the current from the converter 12A is such that the current flow through resistor 85 from the converter 12A is opposite in direction from that of converter 12. Thus, it will be seen that in FIG. 2 the "set point" current for the controller is obtained from the voltage-to-current converter 12A as-sociated with the "wild" variable rather than from a hand-set potentiometer, as in FIG. 1. Furthermore, the effectiveness of the current from the converter 12A in determining the set point of the controller is adjustable in FIG. 2 as by change in the position of contact 85a relative to the resistor 85. It may be further observed that in addition to the resistors 13 and 14 of FIG. 1, there have also been included an additional current-dividing resistor 87 and an additional series-resistor 88. These resistors may be adjustable if desired in order to establish selected limits for the ratio of the effects of the currents from the respective converters 12 and 12A.

In brief, the operation is as follows: If it is desired that the temperature of furnace 10 have a maximum change of two degrees for every degree of change of temperature of furnace 10A, then the resistor 87 will have a value so that the change in current through resistor 85, due to a change in temperature of furnace 10 of one degree, is one-half the change in current through resistor 85 due to a change in temperature of furnace 10A of one degree. Under these assumed conditions with contact 85a in its uppermost position, the ratio between the changes in the controlled and wild variables will be 2:1, whereas with the contact 85a in the mid-position of resistor 85, the ratio will be 1:1. More particularly, and with the contact 85a in its uppermost position, when the temperature of furnace 10A changes one degree, the increased current flow by way of resistor 84 through resistor 85 produces an output $E_{Prop.}$ to change the heating current through the heating resistor 37. The temperature of the furnace 10 when it rises by one degree produces an increased current flow through the resistor 85, but of magnitude insufficient to balance the current flow through that resistor from converter 12A because of added resistor 87. However, when the temperature of furnace 10 is increased by two degrees, there is achieved current balance, and the output signal or the proportional voltage $E_{Prop.}$ is reduced to zero. Since in the foregoing description it was assumed that contact 85a was at its uppermost position, it will be seen that as that contact 85a is moved downwardly or toward conductor 32, the ratio will be linearly decreased from two-to-one to a selected value between two-to-one and zero-to-one.

Figure 3:
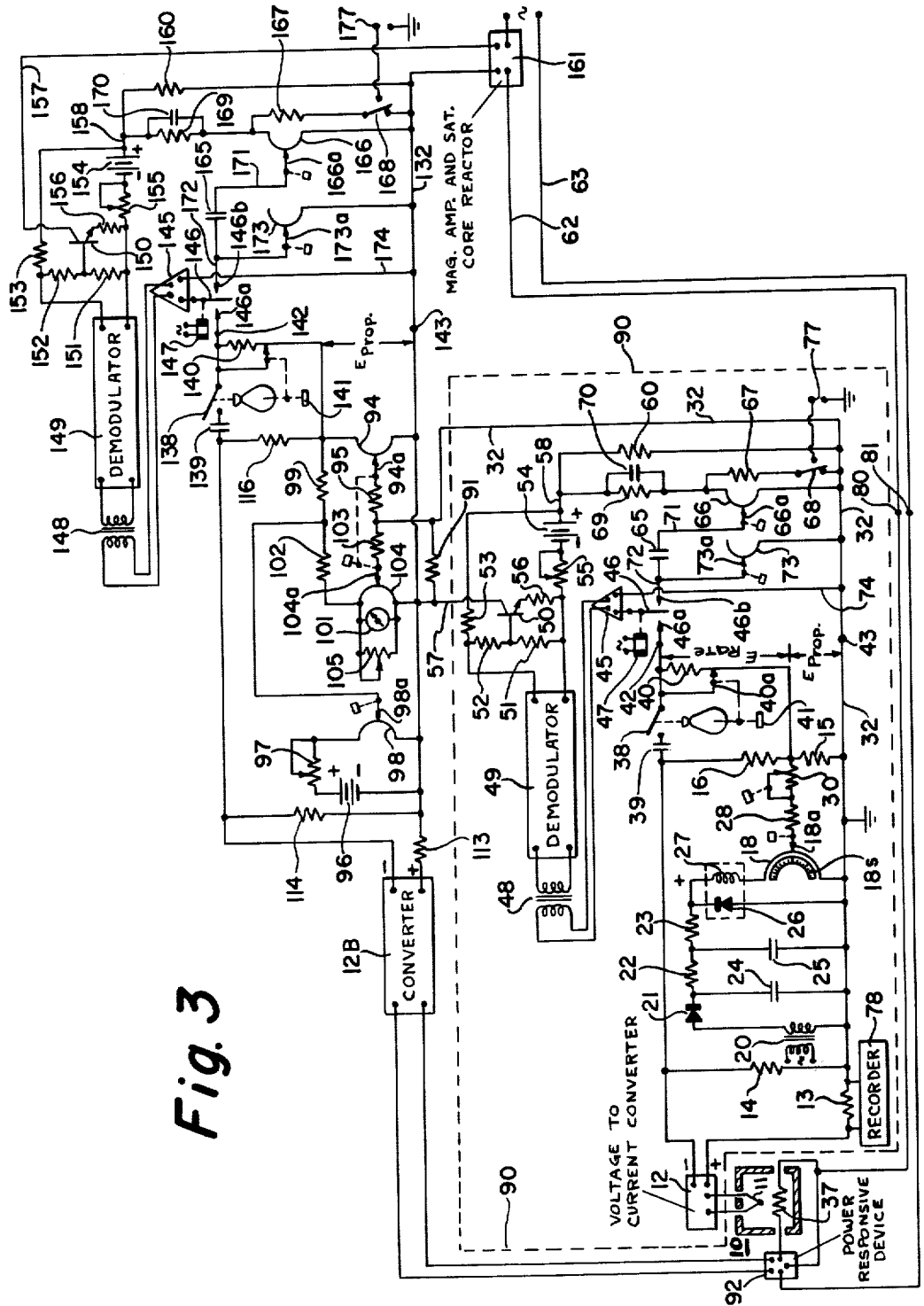
FIG. 3 is a wiring diagram of a further modification.

In some applications, the control agent may be subject to wide variations. For example, there may be wide fluctuations in the voltage of the alternating-current source shown for the heating resistor 37 of furnace 10 of FIG. 1. When conditions of the foregoing kind are present, the present invention lends itself to a cascading of the system, the result of which will be to maintain uniform the temperature of furnace 10 notwithstanding wide fluctuations in the voltage of the source of heating current. Such an arrangement is shown in FIG. 3 for the furnace 10 having a thermocouple 11, and in which the block 90 includes the whole of the system of FIG. 1 from thermocouple 11 to conductors 32 and 57 with the output current (which in FIG. 1 is shown applied to the amplifier and saturable core reactor 61) applied to a current-dividing resistor 91.

A power-responsive device 92, such as a thermal converter, is connected to be responsive to the power delivered to the heating resistor 37 and to produce a direct-current voltage output which is applied to a voltage-to-current converter 12B of the same type as in FIG. 1. The output from the converter 12B is applied to a circuit which includes resistors 113, 114 and 116 corresponding in function with resistors 13, 14 and 16 of FIG. 1. Similarly, other like parts have been given the same reference characters in the hundred series, i.e., part 38 et seq. of FIG. 1 appears as parts 138, 139, etc. in FIG. 3. A resistor 94 in FIG. 3 performs functions similar to the functions of resistor 15 of FIG. 1 in that there is developed across that resistor a voltage $E_{Prop.}$. In FIG. 3, the $E_{Prop.}$ is proportional to the deviation of the magnitude of the power supplied to heating resistor 37 from its "set point." The power supply "set point" in turn is determined by the current output from the temperature controller of block 90 by way of conductors 32 and 57 in conjunction with the low limit current from slidewire resistor 98. The polarity of the connections is such that current from the system 90 flows by way of a resistor 95 through a fractional part of the resistor 94 in a direction opposite to the current flow through resistor 94 from the converter 12B. Accordingly, it will be seen that there has been cascaded the system of FIG. 1 in that the control output of system 90 is used to readjust the set-point of the power supply controller.

If there is a change in the power input to heater coil 37, such change will be reflected in a change in current output from the converter 12B. Through the action of the magnetic amplifier and saturable core reactor 61 which forms a part of the system of FIG. 3, there will be produced a change in heating current to restore the heating effect of resistor 37 in the absence of the delay required for a change in temperature of furnace 10. Thus, there has been provided an anticipatory control of an effective character for maintaining more uniform the temperature of furnace 10, notwithstanding wide fluctuations in the power delivered to the heating resistor 37. If the temperature of furnace 10 should change, due for example to change in load, the control system 90 will detect the deviation of the temperature from its set point and initiate a change in output current in conductors 32 and 57. Such change in current will include the provisions of proportional rate and reset action to whatever extent desired. This change in output current effects a change in the set point for the power supply controller to change the power input to the heating resistor 37 to restore the temperature to its desired magnitude.

In addition to the foregoing features, there are provided means for establishing a predetermined low limit for the set point of the power-responsive device 92, that is to say, there will be maintained a minimum power input to the resistor 37, notwithstanding the temperature of the furnace 10. This is accomplished by means of a source of supply 96 connected through a rheostat 97 to a slidewire 98. From a movable contact 98a of slidewire 98, a current path is provided through the resistor 94 by way of a resistor 99. The polarity is such that the current flows downwardly through resistor 94 and in a direction opposite to the current through resistor 94 from converter 12B. Thus, the current flow through resistor 94 by way of resistor 99 is in the same direction as the current flow from the system 90. This establishes the minimum value of power delivered to the resistor 37. A contact 94a on slidewire 94 is adjustable to change the span. The "span" may be defined as the extent that the set point of the secondary control system can be moved for a full scale change in cascade current. The set point for the temperature to be maintained in furnace 10 will be determined in the system 90 as by adjustment of contact 18a of FIG. 1. The span adjustment in the secondary control system varies the effectiveness of the cascade current derived by way of conductors 32 and 57 upon the set point of the secondary controller. The span adjustment will be in percent of total range of the output of the converter 12B.

In order visually to indicate the existing set point of the secondary system, there is provided a meter 101 connected in a circuit responsive to both the low-limit setter and the cascade current and in manner identical with the parts associated with the resistor 94. Thus, resistor 102 has a resistance equal to that of resistor 99; resistor 103 has a resistance equal to that of resistor 95; and resistor 104 has a resistance equal to that of resistor 94. The contact 104a is ganged with contact 94a for corresponding movement. By adjustment of a calibrating shunt 105 of meter 101, the meter will respond to changes in positions of contacts 98a and 94a and 104a and the current output from control system 90 to indicate at all times the set point of the secondary system which will be calibrated in percent from zero to one hundred. A reading of 50% means that the control action of the secondary system will maintain output from the voltage-to-current converter 12B at 50% of its maximum value. Thus, while the set point of the primary system 90 is in terms of the temperature of furnace 10, the set point of the secondary system is in terms of percent of the maximum output of the power-responsive device 92 and the converter 12B.

In summary, it will be seen that there has been provided a system in which there are produced a plurality of signals. The first signal has a magnitude related to that of the condition under control. A second signal has a magnitude related to a desired magnitude of the condition. A third signal produced in dependence upon the first signal and independent of the second varies in accordance with the rate of change of said condition. These signals are combined to produce an output signal having a proportional component and a rate component for varying the magnitude of the condition in a direction to maintain that magnitude at a desired value. If desired, the output signal may additionally include a reset component of control action.

With the above understanding of the invention and the several modifications thereof, it will be understood that other modifications may be made and certain features used without other features, all within the scope of the appended claims.

What is claimed is:

1. An automatic control system for controlling the magnitude of a condition, comprising means responsive to the magnitude of said condition for producing a first current related in magnitude to that of said condition, means for producing a second current of magnitude related to a desired magnitude of said condition, resistance means connected to be traversed in opposite sense by said currents for development across said resistance of a potential difference of polarity corresponding with the direction of flow of the resultant current through said resitsance means and of magnitude proportional to the magnitude of said resultant current, means responsive to the potential difference across said resistance means for producing an output current which varies in sense and magnitude with the polarity and magnitude of said potential difference, a resistor having a movable contact, a connection for flow of said output current in one direction through a selected fraction of said resistor, means for regulating a final control agent adapted to vary the magnitude of said condition, means responsive to a condition-varying effect of said agent for producing through said resistor current flow in the opposite direction and of magnitude related to said condition-varying effect of said agent, and means responsive to the direction and magnitude of the potential difference across said resistor for varying said means for controlling said agent for varying the application of said agent upon change in the magnitude of said condition and upon change in its effectiveness upon the magnitude of said condition.

2. The system of claim 1 in which there is provided a rate action circuit for introducing into the control of said agent a rate action proportional to the rate of change of said condition-varying effect of said agent.

3. An automatic control system for controlling the magnitude of a condition, comprising means responsive to the mangitude of said condition for producing a first signal related in magnitude to that of said condition, means for producing a second signal of magnitude related to a desired magnitude of said condition, circuit means connected for application thereto in opposite sense of said signals for development of an output signal dependent upon the direction of difference and the extent of difference between said signals, a resistor connected in circuit with said first-named means for producing a signal, the circuit connections thereto excluding the means producing the other of said signals, a rate action circuit responsive to the signal produced across said resistor for producing a rate action signal, and means responsive jointly to the rate action signal from said rate action circuit and to said output signal developed by said circuit means for varying the magnitude of said condition in a direction to reduce at said circuit means the difference between said signals to zero.

4. The system of claim 3 in which there is provided in series-circuit relation with said circuit means a signal-producing circuit including a source of supply, and means for adjusting the magnitude of the signal applied to said circuit means without affecting the magnitude of the rate action developed by said rate circuit.

5. An automatic control system for controlling the magnitude of a condition, comprising means responsive to the magnitude of said condition for producing a first signal related in magnitude to that of said condition, means for producing a second signal of magnitude related to a desired magnitude of said condition, a resistor connected in circuit with said first-named means, the circuit connections to said resistor excluding the means producing the other of said signals, a rate action circuit responsive to the signal produced across said resistor for producing a third signal varying in accordance with the rate of change of said magnitude of said condition, and means responsive jointly to said signals for varying the magnitude of said condition in a direction to restore it to said desired magnitude.

6. An automatic control system for controlling the magnitude of a condition comprising resistance means,
   an adjustable source of supply connected in series circuit with said resistance means,
   said source including means for establishing and maintaining a current flow through said resistance means directly proportional to the output voltage of said adjustable source throughout its range of adjustment whereby said source will produce a first current of selected magnitude through said resistance means,
   a converter having an output circuit and input means responsive to the magnitude of said condition for producing in said output circuit a current of magnitude proportional to the magnitude of said condition,
   means connecting said current output circuit in series with said resistance means by way of a loop circuit which excludes said adjustable source of supply for flow of a second current through said resistance means in a direction opposite to the direction of flow of said first current,
   the net difference in said currents flowing through said resistance means producing a first potential difference across said resistance means of magnitude proportional to and of polarity corresponding with the direction of flow of the resultant of said first and said second occurrences,
   a resistor connected in series in that part of said loop circuit which excludes said adjustable source of supply,
   a rate action circuit responsive to the signal produced across said resistor for producing a second potential difference varying in accordance with the rate of change of said magnitude of said condition,
   said adjustable current source producing through said resistance means said selected magnitude of said first current corresponding with the magnitude of said condition at a selected value,
   said potential difference across said resistance means having a magnitude proportional to, and a polarity corresponding with the direction of flow of, the resultant of said first and said second currents,
   means including a detector-amplifier having an input circuit including said resistance means responsive to the algebraic sum of said potential differences for varying the magnitude of said condition in a direction to reduce to zero said potential differences, and
   means responsive to the output of said detector-amplifier for introducing into said input circuit of that detector-amplifier a negative feedback voltage.

7. The system of claim 6 in which said resistance means includes a resistor and a tap relatively movable one with respect to the other, in which there are provided connections for flow of said second current through the whole of said resistor and in which there are provided means for flow of said first current through said resistor by way of said tap.

8. The system of claim 6 in which said rate action circuit includes a capacitor and an adjustable resistor across which said second potential difference is developed connected in series in another loop circuit including said first-named resistor.

9. The system of claim 6 in which said means for producing said feedback signal includes a reset capacitor and a reset resistor connected in said feedback circuit for introducing reset action into the operation of said means for varying the magnitude of said condition.

10. The system of claim 9 in which there is provided additional means for modifying the operation of said feedback circuit for varying the signal fed back to said reset capacitor and said reset resistor in response to the magnitude of another condition.

11. The system of claim 6 in which said adjustable source of supply for said resistance means includes only a second converter for producing said first current and having input means responsive to the magnitude of another condition, said second converter including means for maintaining a proportionality between said magnitude of said second condition and the magnitude of said first current produced thereby.

12. The system of claim 11 in which said resistance means has an adjustable contact for regulating the amount of resistance in series with said first current for adjusting the ratio of the control action as between said means responsive to the magnitude of said first and of said second-named conditions.

13. An automatic control system for controlling the magnitude of a condition comprising resistance means, an adjustable source of supply connected in series circuit with said resistance means,
   said source including means for establishing and maintaining a current flow through said resistance means directly proportional to the output voltage of said adjustable source throughout its range of adjustment whereby said source will produce a first current of selected magnitude through said resistance means,
   a converter having an output circuit and input means responsive to the magnitude of said condition for producing in said output circuit a current of magnitude proportional to the magnitude of said condition,
   means connecting said current output circuit in series with said resistance means by way of a loop circuit which excludes said adjustable source of supply for flow of a second current through said resistance means in a direction opposite to the direction of flow of said first current,
   the net difference in said currents flowing through said resistance means producing a first potential difference across said resistance means of magnitude proportional to and of polarity corresponding with the direction of flow of the resultant of said first and said second occurrences,
   a resistor connected in series in that part of said loop circuit which excludes said adjustable source of supply,
   a rate action circuit responsive to the signal produced across said resistor for producing a second potential difference varying in accordance with the rate of change of said magnitude of said condition,
   said adjustable current source producing through said resistance means said selected magnitude of said first current corresponding with the magnitude of said condition at a selected value,
   said potential difference across said resistance means having a magnitude proportional to, and a polarity corresponding with the direction of a flow of, the resultant of said first and said second currents, and means including a detector-amplifier having an input circuit including said resistance means responsive to the algebraic sum of said potential differences for varying the magnitude of said condition in a direction to reduce to zero said potential differences.

References Cited in the file of this patent

UNITED STATES PATENTS

| | | |
|---|---|---|
| 2,375,159 | Wills | May 1, 1945 |
| 2,512,702 | White | June 27, 1950 |
| 2,618,674 | Stanton | Nov. 18, 1952 |
| 2,666,171 | Williams | Jan. 12, 1954 |
| 2,823,862 | Moore | Feb. 18, 1958 |
| 2,829,231 | Troost | Apr. 1, 1958 |

FOREIGN PATENTS

| | | |
|---|---|---|
| 388,773 | Great Britain | Feb. 20, 1933 |
| 637,312 | Great Britain | May 17, 1950 |

UNITED STATES PATENT OFFICE

CERTIFICATE OF CORRECTION

Patent No. 3,092,321

June 4, 1963

Edward J. Cranch et al.

It is hereby certified that error appears in the above numbered patent requiring correction and that the said Letters Patent should read as corrected below.

Column 10, line 63, for "sense" read -- senses --; column 11, line 49, and column 12, line 60, for "occurrences", each occurrence, read -- currents --.

Signed and sealed this 23rd day of June 1964.

(SEAL)
Attest:

ERNEST W. SWIDER
Attesting Officer

EDWARD J. BRENNER
Commissioner of Patents